US010164263B2

(12) United States Patent
Kim et al.

(10) Patent No.: US 10,164,263 B2
(45) Date of Patent: Dec. 25, 2018

(54) CURRENT COLLECTOR FOR SECONDARY BATTERY AND ELECTRODE USING SAME

(71) Applicant: JENAX INC., Busan (KR)

(72) Inventors: Chang Hyeon Kim, Chungcheongnam-do (KR); Min Gyu Choi, Sejong (KR); Lee Hyun Shin, Busan (KR)

(73) Assignee: JENAX INC., Busan (KR)

( * ) Notice: Subject to any disclaimer, the term of this patent is extended or adjusted under 35 U.S.C. 154(b) by 0 days.

(21) Appl. No.: 14/392,221

(22) PCT Filed: Jun. 24, 2014

(86) PCT No.: PCT/KR2014/005603
§ 371 (c)(1),
(2) Date: Dec. 24, 2015

(87) PCT Pub. No.: WO2014/208997
PCT Pub. Date: Dec. 31, 2014

(65) Prior Publication Data
US 2016/0181620 A1     Jun. 23, 2016

(30) Foreign Application Priority Data

Jun. 24, 2013    (KR) .................... 10-2013-0072359

(51) Int. Cl.
*H01M 4/66*    (2006.01)
*H01M 4/80*    (2006.01)
(Continued)

(52) U.S. Cl.
CPC ......... *H01M 4/806* (2013.01); *H01M 4/0416* (2013.01); *H01M 4/13* (2013.01);
(Continued)

(58) Field of Classification Search
CPC ...... H01M 4/665; H01M 4/666; H01M 4/668; H01M 4/74; H01M 4/747; H01M 4/75
See application file for complete search history.

(56) References Cited

U.S. PATENT DOCUMENTS

2007/0287064 A1* 12/2007 Suzuki ................. H01G 11/38
429/217
2009/0186276 A1*  7/2009 Zhamu ................. H01M 4/045
429/221

(Continued)

FOREIGN PATENT DOCUMENTS

| KR | 10-2011-0001828 | 1/2001 |
| KR | 10-1088073 | 12/2011 |
| KR | 10-2012-0114117 | 10/2012 |

OTHER PUBLICATIONS

International Search Report dated Sep. 30, 2014 for PCT/KR2014/005603.

(Continued)

*Primary Examiner* — Jeremiah R Smith
(74) *Attorney, Agent, or Firm* — Jones Day

(57) ABSTRACT

The present invention relates to a battery technology, and more particularly, to a current collector that may be widely used in secondary batteries and an electrode employing the same. The current collector includes a conductive fiber layer including a plurality of conductive fibers. Each of the conductive fibers includes a conductive core consisting of a plurality of metal filaments; and a conductive binder matrix surrounding the outer circumferential surfaces of the conductive core.

19 Claims, 4 Drawing Sheets

(51) Int. Cl.
  *H01M 4/13* (2010.01)
  *H01M 4/04* (2006.01)
  *H01M 10/0525* (2010.01)
  *H01M 4/75* (2006.01)
  *H01M 4/74* (2006.01)
  *H01M 4/62* (2006.01)
  *H01M 10/052* (2010.01)

(52) U.S. Cl.
  CPC ........... *H01M 4/661* (2013.01); *H01M 4/662* (2013.01); *H01M 4/663* (2013.01); *H01M 4/667* (2013.01); *H01M 4/668* (2013.01); *H01M 10/0525* (2013.01); *H01M 4/622* (2013.01); *H01M 4/625* (2013.01); *H01M 4/665* (2013.01); *H01M 4/666* (2013.01); *H01M 4/74* (2013.01); *H01M 4/747* (2013.01); *H01M 4/75* (2013.01); *H01M 10/052* (2013.01); *H01M 2220/30* (2013.01)

(56) References Cited

U.S. PATENT DOCUMENTS

| | | | |
|---|---|---|---|
| 2009/0311587 A1* | 12/2009 | Best | H01M 4/74 |
| | | | 429/127 |
| 2011/0311876 A1* | 12/2011 | Sturgeon | H01M 4/663 |
| | | | 429/232 |
| 2013/0157128 A1 | 6/2013 | Solan et al. | |

OTHER PUBLICATIONS

Written Opinion of the International Search Report dated Sep. 30, 2014 for PCT/KR2014/005603.

\* cited by examiner

CURRENT COLLECTOR FOR SECONDARY BATTERY AND ELECTRODE USING SAME

This application claims the priority of Korean Patent Application No. 10-2013-0072359, filed on Jun. 24, 2013 in the KIPO (Korean Intellectual Property Office), the disclosure of which is incorporated herein entirely by reference. Further, this application is the National Stage application of International Application No. PCT/KR2014/005603, filed Jun. 24, 2014, which designates the United States and was published in Korean. Each of these applications is hereby incorporated by reference in their entirety into the present application.

TECHNICAL FIELD

The present invention relates to a secondary battery technology, and more particularly, to a current collector that may be widely used in secondary batteries and an electrode using the same.

BACKGROUND ART

Along with growth of industries related to portable electronic devices associated with developments of semiconductor fabricating technologies and communication technologies and increasing demand for development of an alternative energy based on environmental conservation and resource exhaustion, battery-related techniques are being actively researched. Particularly, secondary batteries that can be recharged and repeatedly used are being researched.

Fields of applications of secondary batteries are expanding from batteries for, small devices, such as mobile phones, laptop PCs, and mobile display devices, to mid-sized and large-sized batteries including batteries for electric vehicles and batteries applied to hybrid vehicles. Basically demanded features of such a battery include small weight, small volume, high energy density, excellent charging/discharging speeds, excellent charging/discharging efficiencies, excellent cycle characteristics, high stability, and high economic feasibility.

DISCLOSURE OF THE INVENTION

Technical Problem

The present invention provides a current collector for improving charging/discharging efficiencies and charging/discharging speed by reducing internal resistance between the current collector and an electrically active material layer, and improving cycle characteristics, and life expectancy of a battery by accepting volume change of an electrically active material due to repeated charging/discharging operations.

The present invention also provides an electrode employing a current collector having the above-stated advantages.

Technical Solution

According to an aspect of the present invention, there is provided a current collector for a secondary battery, which includes a conductive fiber layer including a plurality of conductive fibers. Each of the conductive fibers includes a conductive core consisting of a plurality of metal filaments; and a conductive binder matrix surrounding the outer circumferential surfaces of the conductive core.

According to an embodiment of the present invention, the current collector may further include a substrate combined with one main surface of the conductive fiber layer. The substrate may be combined with the conductive fiber layer via fusion of the conductive binder matrix. The substrate may include a metal foil, a mesh, a polymer resin-based insulation film, a metal thin-film layer, or a stacked structure thereof.

The plurality of metal filaments may include a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof. The current collector may further include auxiliary filaments having from about 1% to about 50% lengths of the metal filaments in the conductive fiber layer. The auxiliary filaments may include bare metal filaments without a conductive binder matrix.

According to some embodiments, the conductive binder matrix may be coated onto each of the individualized conductive cores. According to an embodiment of the present invention, the conductive binder matrix may be continuously coated onto conductive cores adjacent to one another.

The conductive binder matrix may include a conductive polymer material. The conductive polymer material may include polyaniline, polyoxyphenylene, polyphenylene sulfide, polythiophene, polyfuran, polypyrrole, polymethylpyrrole, polystyrene, a derivative thereof, or a copolymer thereof.

The conductive binder matrix may be a mixed composition of a polymer binder material and a conductive material dispersed in the polymer binder material. The polymer binder material may include carboxy methyl cellulose (CMC), polybutadiene, polyisoprene, polybutyl acrylate, polybutyl methacrylate, polyhydroxyethyl methacrylate, polyacrylamide, polyisobutylene, isobutylene-isoprene rubber, polyvinylidenefluoride-hexafluoropropylene copolymer (PVDF-co-HFP), polyvinylidenefluoride (PVDF), polyacrylonitrile, polymethylmethacrylate, polytetrafluoroethylene (PTFE), styrenebutadiene rubber (SBR), butyl acrylate-styrene copolymer, butyl acrylate-acrylic nitrile copolymer, butyl acrylate-acrylic nitrile-glycidyl methacrylate copolymer, isobutylene-styrene copolymer, ethylene-propylene-diene copolymer: EPDM, a derivative thereof, a homopolymer thereof, a condensation polymer thereof, a copolymer thereof, a block polymer thereof, or a combination thereof. The conductive material may include carbon black, superfine graphite particles, acetylene black, fine carbon, a metal particle, metal indium tin oxide (ITO), carbon nanotubes, or a combination thereof.

According to another aspect of the present invention, there is provided an electrode including the above-stated current collector; and an electrically active material impregnated into the conductive fiber layer. According to some embodiments, thickness of the conductive binder matrix may be from about 10% to about 90% of an average particle size of the electrically active material.

The conductive binder matrix is gelated to easily secure surface contact between the electrically active material and the conductive fibers. The electrode may be for a lithium secondary battery.

Advantageous Effects

According to an embodiment of the present invention, a current collector having a three-dimensional network structure may be obtained based on a current collector including a conductive fiber layer. A plurality of metal filaments constituting the conductive fiber layer are individualized and are physically combined with one another by being bent or tangled, and thus pores in the conductive fiber layer may be easily changed. Therefore, it is easy to impregnate an electrically active material into a current collector, and the metal filaments are introduced into an electrically active material layer, thereby reducing internal resistance of an electrode. Furthermore, linear binders that are fused to the metal filaments and combines the metal filaments to one another absorbs stresses based on change of volume of the electrically active material due to charging/discharging of a battery and maintains structure of the conductive fiber layer, thereby preventing reduction of irreversible capacity and life expectancy due to detachment of the electrically active material from the metal filaments.

According to another embodiment of the present invention, since the conductive fiber layer may be fabricated in fabric operations known in the art, operations for fabricating the conductive fiber layer may be easily performed. Furthermore, since the conductive fiber layer has flexibility, a battery that may be packaged in various forms may be obtained.

BRIEF DESCRIPTION OF THE DRAWINGS

FIG. 2A is a diagram showing a case in which the conductive binder matrix is pre-coated onto the conductive core, whereas

MODE FOR CARRYING OUT THE INVENTION

Figure 1A:
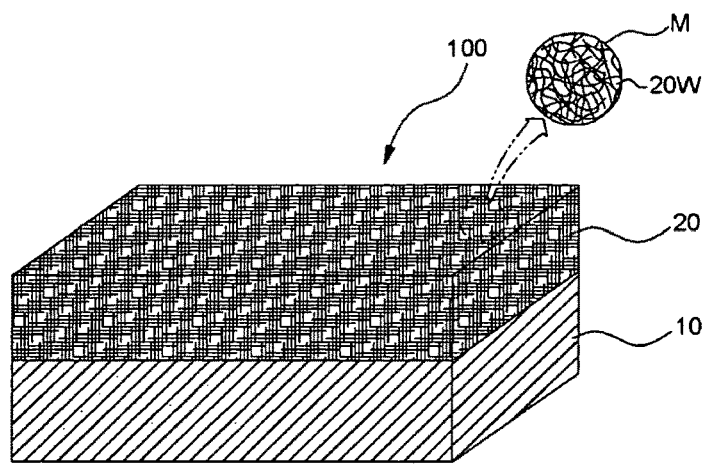
FIG. 1A is a perspective view of a current collector 100 according to an embodiment of the present invention.

Hereinafter, exemplary embodiments will be described in detail with reference to accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Furthermore, in the drawings, the thicknesses of layers and regions are exaggerated for clarity, and like reference numerals in the drawings denote like elements. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although numerical terms (e.g., "first" and "second") are used herein to describe various members, parts, regions, layers and/or sections, these members, parts, regions, layers and/or sections are not to be limited by these terms. These terms are only used to distinguish one member, part, region, layer or section from another member, part, region, layer or section. Thus, for example, a first member, part, region, layer or section discussed below could be termed a second, part, region, layer or section without departing from the teachings of the illustrated embodiments.

Furthermore, metal filaments disclosed in the present specification are fabricated by fiberizing a metal and refers to metal fibers having an average diameter from about 0.1 μm to about 50 μm (preferably, from about 2 μm to about 20 μm) and an average length from about 10 mm to about 150 mm (preferably, from about 35 mm to about 120 mm), for example. Within the above-stated ranges of dimensions, the metal filament feature properties of metals, that is, heat-resistance, plasticity, and electric conductivity and also feature flexibility and mechanical advantages unique to fibers for fabricating a weaved fabric and a non-woven fabric.

The metal filaments may be fabricated by maintaining a metal or an alloy in a suitable container in the form of a molten liquid and rapidly solidifying the molten liquid by jetting the molten liquid into the air via discharge holes of the container by using a compressed gas or a pressing device, such as a piston. Alternatively, metal filaments may be fabricated by using a bundle drawing method known in the art. By controlling a number and size of the discharge holes and/or scattering of discharged molten metal, thickness, uniformity, tissue like non-woven fabric, and aspect ratio of metal filaments may be controlled.

Metal filaments according to the present invention may include not only metal filaments fabricated by using the above-stated fabrication methods, but also metal filaments fabricated by using other methods known in the art, where the present invention is not limited thereto. The metal filament according to the present invention feature properties of metals, that is, heat-resistance, plasticity, and electric conductivity and also feature flexibility and mechanical advantages unique to fibers for fabricating a weaved fabric and a non-woven fabric. The present invention relates to characteristics and advantages in case of applying the above-stated advantages of metal filaments to a current collector of a battery.

Figure 1B:
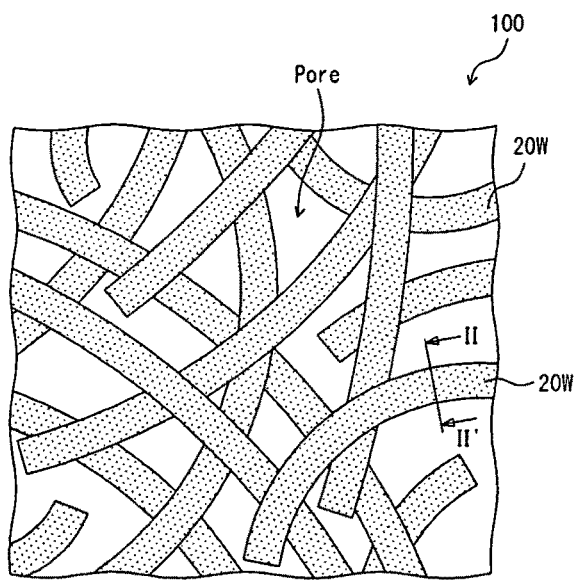
FIG. 1B is a partially magnified view of a region M of FIG. 1A.

FIG. 1A is a perspective view of a current collector 100 according to an embodiment of the present invention, and FIG. 1B is a partially magnified view of a region M of FIG. 1A.

Referring to FIG. 1A, the current collector 100 includes a conductive substrate 10 and a conductive fiber layer 20. The conductive substrate 10 may be a metal foil. According to another embodiment of the present invention, the conductive substrate 10 may be a metal mesh or a structure in which a metal foil and a metal mesh are stacked or another layer, such as a binder layer, is interposed therebetween. The conductive substrate 10 may include a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof. For example, in case of a current collector for an anode electrode, the conductive substrate 10 may be a copper foil. In case of a current collector for a cathode electrode, the conductive substrate 10 may be an aluminum foil.

Referring to FIGS. 1A and 1B, the conductive fiber layer 20 is a conductive network layer including a skeleton structure consisting of a plurality of 1-dimensional linear conductive fibers 20W. Pores are formed between the conductive fibers 20W, and the pores are exposed on a surface of the conductive fiber layer 20. The pores may be formed from surfaces of the conductive fibers 20W to the interior of the conductive fibers 20W. The pores may become spaces for storing an electrically active material to be provided to the current collector 100 or provide paths for ion movement during oxidization or reduction of a battery.

Figure 2A:
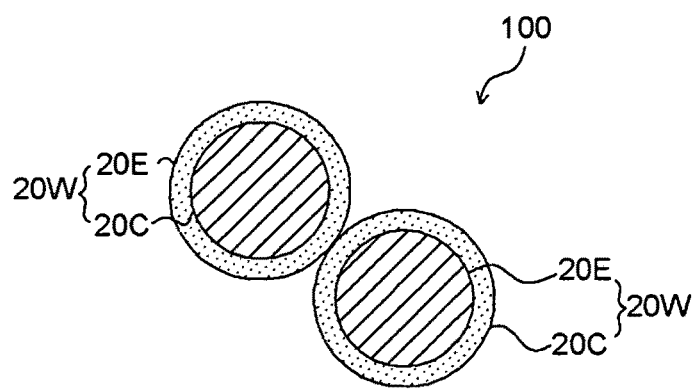

In relation to the conductive fibers 20W, referring to FIG. 2A, which is a schematic sectional view of the conductive fibers 20W obtained along a line II-II' of FIG. 1B, each of the conductive fibers 20W according to an embodiment of the present invention includes a conductive core 20C inside the conductive fiber 20W and a conductive binder matrix 20E surrounding the circumferential surface of conductive core 20C.

The conductive core 20C includes metal filaments. The metal filaments have a 1-dimensional linear structure that provides a conduction path and may form a non-woven fabric by being randomly tangled with one another, where current flow throughout the conductive fiber layer 20 may be secured thereby. The metal filaments are fibrous bodies individualized from one another and may form a 3-dimensional porous fibrous structure via a bridging operation or another fiber blending operation. Therefore, the metal filaments may be distinguished from a metal mesh or metal foam in which a conductive network are formed by integrating a plurality of fibers with one another or bonded to one another by being thermally alloyed. Therefore, unlike the metal mesh or the metal foam, the conductive fiber layer 20 exhibits improved structural flexibility and enables easy impregnation of an electrically active material via deformable pores.

The metal filaments may include a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof. According to some embodiments, the metal filaments may be formed of a metal identical to the metal constituting the conductive substrate 10. For example, in a current collector for an anode electrode, if the conductive substrate 10 is a copper foil, the metal filaments may be copper fibers. In a current collector for a cathode electrode, if the conductive substrate 10 is an aluminum foil, the metal filaments may be aluminum fibers.

According to another embodiment of the present invention, the conductive core 20C and the conductive substrate 10 may be formed of different metals. For example, in a current collector for an anode electrode, a metal included in the conductive substrate 10 may be copper, and the conductive core 20C may include a stainless steel. In the same regard, in a current collector for a cathode electrode, the conductive substrate 10 may include aluminum, and the conductive core 20C may include a stainless steel.

An average length of the metal filaments may be within a range from about 10 mm to about 150 mm, whereas an average thickness thereof may be within a range from about 0.1 µm to about 50 µm. If thickness of the metal filaments is less than 0.1 µm, it is difficult to form filaments having uniform material properties (e.g., uniform resistance or uniform strength) and to secure sufficient mechanical strength for restraining an impregnated electrically active material while being resistant to change of volume based on charging/discharging of a battery. If thickness of the metal filaments exceeds 50 µm, surface area per volume of metal filaments decreases. As a result, it is difficult to improve battery charging/discharging efficiencies that are proportional to increase of surface areas and energy density decreases. Metal filaments having the above-stated dimensions may be obtained by being segmented from continuous metal fibers, and a non-woven fabric structure may be formed by using the same.

When it is changed to a surface area to volume ratio per unit length (e.g., if a metal filament has a circular cross-section, 4/diameter), the metal filaments having a thickness from about 0.1 µm to about 50 µm has a surface area to volume ratio from about $8 \times 10^4$ (1/m) to about $4 \times 10^7$ (1/m). Generally, a conventional current collector employing a metal foil has a thickness of about 20 µm. Metal filaments having thicknesses from about 0.1 µm to about 50 µm have a surface area that is from about 1.8 times to about 400 times greater than that of the conventional current collector employing a foil having thickness of 20 µm. A surface area of a current collector refers to a surface area per volume of the metal filaments 20W forming reactive interfaces respectively against an electrically active material and an electrolyte. Therefore, a battery with reduced internal resistance and significantly increased energy density may be obtained by maximizing the surface area of the current collector.

According to another embodiment of the present invention, metal filaments constituting a conductive network may have one or more of length or thickness different from one another. For example, together with metal filaments constituting the skeleton structure of a conductive fiber layer (also referred to as long filaments; 20W), auxiliary filaments (not shown) having from about 1% to about 50% lengths of the metal filaments 20W may be dispersed in the conductive fiber layer 20. The metal filaments 20W constituting the skeleton structure determine overall conductivity and mechanical strength of the current collector 100, whereas the auxiliary filaments may determine internal resistance of a battery by improving electron transferring paths between an electrically active material and the long filaments or electrical connections between the long filaments. According to some embodiments, the short filaments may not be coated with a binder matrix and may be provided in the conductive fiber layer 20 in the bare form to function as a conductive material.

Figure 2B:
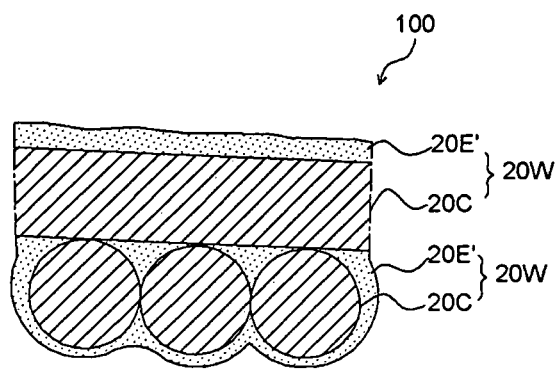
FIG. 2B is a diagram showing a case in which a conductive binder matrix is post-coated onto the conductive core.

A conductive binder matrix coated onto the metal filaments 20W may be pre-coated onto the plurality of conductive fibers 20W before formation of the conductive fiber layer 20 or may be post-coated by using a suitable polymer dispersing solvent after a network structure, e.g., a non-woven fabric structure, by using the metal filaments 20W. FIG. 2A is a diagram showing a case in which the conductive binder matrix 20E is pre-coated onto the conductive core 20C, whereas FIG. 2B is a diagram showing a case in which a conductive binder matrix 20E' is post-coated onto the conductive core 20C. Although the pre-coated conductive binder matrix 20E surrounds a corresponding one of the metal filaments 20W, the post-coated conductive binder matrix 20E' continuously coats and surrounds two or more metal filaments 20W adjacent to each other.

According to another embodiment of the present invention, the conductive binder matrixes 20E and 20E' may include any of various polymer-based materials, such as a mixed composition including a polymer binder material and a conductor dispersed in the polymer binder material. The polymer binder material may include carboxy methyl cellulose (CMC), polybutadiene, polyisoprene, polybutyl acrylate, polybutyl methacrylate, polyhydroxyethyl methacrylate, polyacrylamide, polyisobutylene, isobutylene-isoprene rubber, polyvinylidenefluoride-hexafluoropropylene copolymer (PVDF-co-HFP), polyvinylidenefluoride (PVDF), polyacrylonitrile, polymethylmethacrylate, polytetrafluoroethylene (PTFE), styrenebutadiene rubber (SBR), butyl acrylate-styrene copolymer, butyl acrylate-acrylic nitrile copolymer, butyl acrylate-acrylic nitrile-glycidyl methacrylate copolymer, isobutylene-styrene copolymer, ethylene-propylene-diene copolymer: EPDM, a derivative thereof, and a block copolymer thereof. However, the above-stated polymer binder materials are merely examples, and the present invention is not limited thereto. For example, the polymer binder material may be an olefin-based polymer, an acryl-based polymer, a diene-based polymer, a silicon-containing polymer, a vinyl-based polymer, a fluorine-containing polymer, a thermal hardening elastomer, natural rubber, latex, polypeptide, protein, a mixture thereof, or one of other polymer electrolyte-based material.

A conductive material is dispersed in the polymer binder material, and thus the entire polymer binder material exhibits conductivity. The conductive material may be carbon black, acetylene black, ketjen black, fine carbon like super-fine graphite particles, a metal particle (e.g., copper particles, silver particles, etc.), conductive oxide particles like indium tin oxide (ITO), carbon nanotubes, graphene, or other nano structures with large specific surface areas and low resistances. However, the present invention is not limited thereto.

To form the conductive binder matrixes 20E and 20E' on the conductive core 20C, an additive, such as a polymerization initiator, is selectively added to a solution having dissolved therein a conductive polymer material or a conductive material and a polymer binder material, outer circumferential surfaces of metal filaments are coated with the solution by successively dipping the individualized metal filaments or metal fibers that are not yet chopped into the solution, pulling the same out of the solution, and drying, heating, or oxidizing the same or irradiating a light to the result structure. Therefore, the conductive binder matrixes may be formed. Accordingly, a current collector including a conductive fiber layer having a non-woven fabric structure may be obtained by using metal filaments pre-coated with conductive binder matrixes in a fabric bridging operations, such as a needing punching operation, a spun lacing operation, and a stitch-bonding operation.

As described above with reference to FIG. 2B, in case of post-coating the conductive binder matrix 20E', a metal filament fiber layer having a non-woven fabric structure is formed in one of the above-stated fabric operations first. Next, the fiber layer is coated with a solution having dissolved therein a conductive binder material by dipping the fiber later into the solution and drying and polymerizing the coated polymer material outside the solution. Therefore, conductive binder matrixes may be formed.

An electrically active material may be impregnated into or onto a conductive fiber layer of a current collector fabricated for forming an electrode in the form of slurries. Generally, in case of impregnating an electrically active material in the form of slurries, an organic solvent may be used. An organic solvent used in a follow-up operation like impregnation of slurries may be selected to not to dissolve a conductive binder matrix of a current collector. For example, a current collector coated with a conductive binder matrix may be obtained by forming a mixed solution, which is formed by solving carboxy methyl cellulose (CMC) to water and dispersing silver nano-particles thereto as a conductive material, and fabricating a conductive fiber layer by pre-coating the same onto metal filaments or post-coating the same onto fabricated conductive fiber layer. An electrode may be fabricated by impregnating common slurries for a cathode electrode, e.g., slurries formed by dispersing a cathode electrode active material to n-methyl-2-pyrrolidone (NMP) solvent. Here, since the CMC is not dissolved by the NMP, the conductive binder matrix is not eroded during impregnation of the slurries for a cathode electrode, and structure of a conductive fiber layer may be stably maintained. On the contrary, aqueous slurries may be used for an anode electrode, where an anode electrode may be fabricated by dissolving PVdF to the NMP, pre-coating or post-coating the solution onto metal filaments, and impregnating slurries of an aqueous anode electrode active material. Selectively, a solvent having a certain solubility with respect to the conductive binder matrix may be selected as a solvent for slurries to gelate the conductive binder matrix.

Figure 3A:
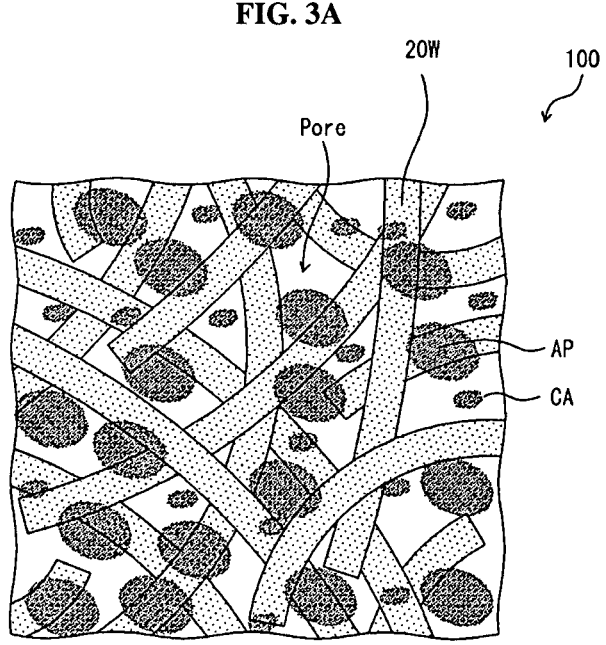
FIG. 3A is a diagram partially showing an electrode employing the current collector according to an embodiment of the present invention.
Figure 3B:
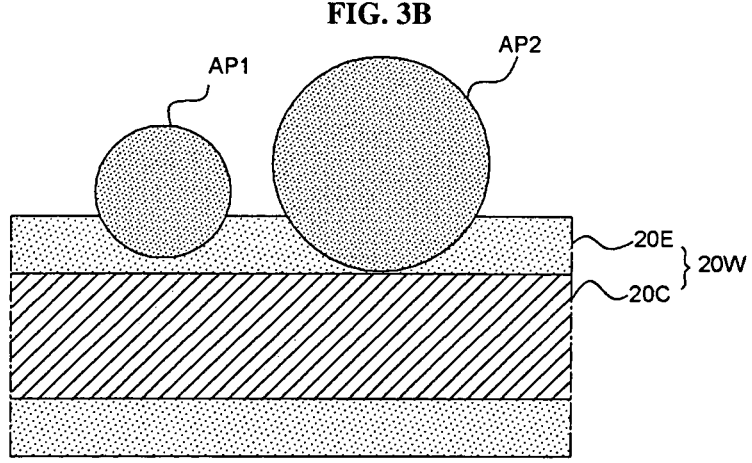
FIG. 3B is a diagram showing a structure in which an electrically active material AP is combined with the current collector.

FIG. 3A is a diagram partially showing an electrode employing the current collector 100 according to an embodiment of the present invention, and FIG. 3B is a diagram showing a structure in which an electrically active material AP is combined with the current collector 100.

Referring to FIG. 3A, an electrically active material AP is impregnated into pores of the current collector 100. The electrically active material AP may be in the form of particles, but the present invention is not limited thereto. For example, the electrically active material AP may not be limited to primary particles and may have a secondary particle structure or a cluster structure having condensed therein a plurality of primary particles.

An electrically active material for a cathode may be an oxide, a phosphate, a sulfide, or a fluoride having binary or more system containing lithium, nickel, chromium, magnesium, strontium, vanadium, lanthanum, cerium, iron, cadmium, lead, titanium, molybdenum, or manganese or a mixture thereof, for example. An electrically active material for an anode may be a low crystalline carbon like soft carbon or hard carbon or a high crystalline carbon including a high temperature pyrolytic carbon, such as natural graphite, Kish graphite, pyrolytic carbon, mesophase pitch based carbon fibers, meso-carbon microbeads, mesophase pitches, and petroleum or coal tar pitch derived cokes. However, the above-stated materials are merely examples, and the present invention is not limited thereto. For example, a chalcogen compound may be used as an electrically active material for the cathode, whereas a sodium suitable for a NaS battery or at least one from among other oxides, carbides, nitrides, sulfides, phosphides, celenides, and tellurides or a monoatomic non-carbon-based active material with excellent lithium ion occluding/discharging capabilities, such as silicon, germanium, tin, lead, antimony, bismuth, zinc, aluminum, iron, and cadmium, an intermetallic compound thereof, or an oxide thereof may be used as an electrically active material for the anode.

According to some embodiments, a conductive material CA may be added together with the electrically active material AP. The conductive material CA may be a same material as the conductive material of the conductive binder matrix as described above. However, since current collector 20W having a fine size equivalent to that of the electrically active material AP may be introduced between the electrically active material AP and secure electric contacts therebetween, the conductive material CA may not be added.

Referring to FIG. 3B, electrically active materials AP1 and AP2 impregnated in the form of particles may electrically contact a current collector in various ways. After the electrically active materials AP1 and AP2 are impregnated into a conductive fiber layer (refer to 20 of FIG. 1A), the conductive fiber layer is pressed and the conductive binder matrix 20E is partially vitrified or melted by applying an energy, such as an ultraviolet ray, heat, or hot air, thereto at the same time, and thus the electrically active materials AP1 and AP2 may be fixed to the conductive fibers 20W of a current collector by the conductive binder matrix 20E.

The conductive binder matrix 20E may not only have elastic properties unique to polymers, but also be gelated or softened in a battery, and thus surfaces of the electrically active materials AP1 and AP2 may partially surface-contact the conductive binder matrix 20E. As a result, low resistance contacts may be obtained between a current collector and the electrically active materials AP1 and AP2. On the contrary, in case of a 2-dimensional surface current collector like a metal foil, an electrically active material on the surface current collector point-contacts the current collector, and thus contact resistance is relatively high. To form such a surface contact, thickness of the conductive binder matrix 20E may be from about 10% to about 90% of an average particle size of the electrically active materials AP1 and AP2.

Furthermore, even if there is no electric connection based on a direct contact between the electrically active material AP1 and the electrically active material AP2, electric connections may be formed between the conductive fibers 20W and the electrically active materials AP1 and AP2. According to an embodiment of the present invention, a contact between the electrically active materials AP1 and AP2 is not essential. As a result, a binder layer applied onto surfaces of an electrically active material in the related art is not required, and thus increase of internal resistance and speed reductions of battery chemical reactions, such as insertion and secession of lithium, do not occur. Furthermore, since the conductive binder matrix 20E is cohesive and elastic, the conductive binder matrix 20E may absorb changes of volumes of the electrically active materials AP1 and AP2 based on charging/discharging of a battery. As a result, according to an embodiment of the present invention, irreversible phenomena, such as a crack of an electrode or an electrical open based on charging/discharging of a battery may be reduced, and thus life expectancy of the battery may be improved.

Figure 4A:
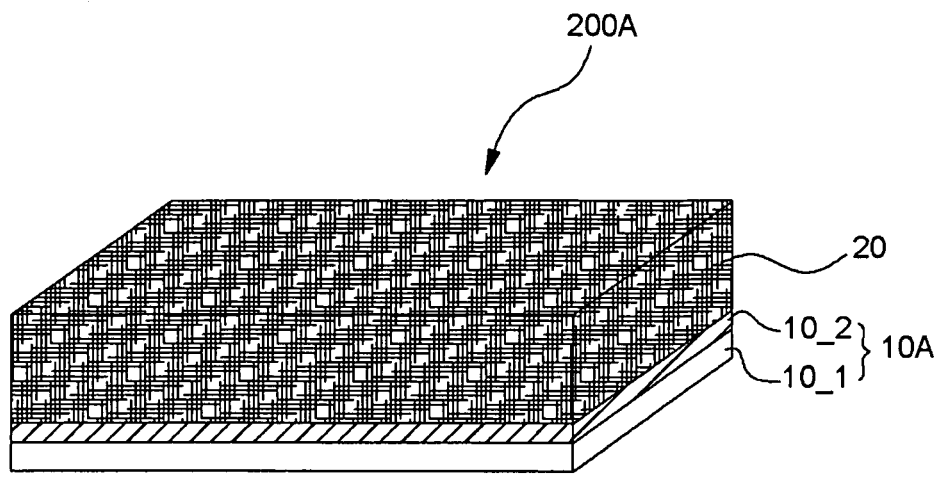
FIGS. 4A and 4B are perspective views of current collectors according to various embodiments of the present invention.
Figure 4B:
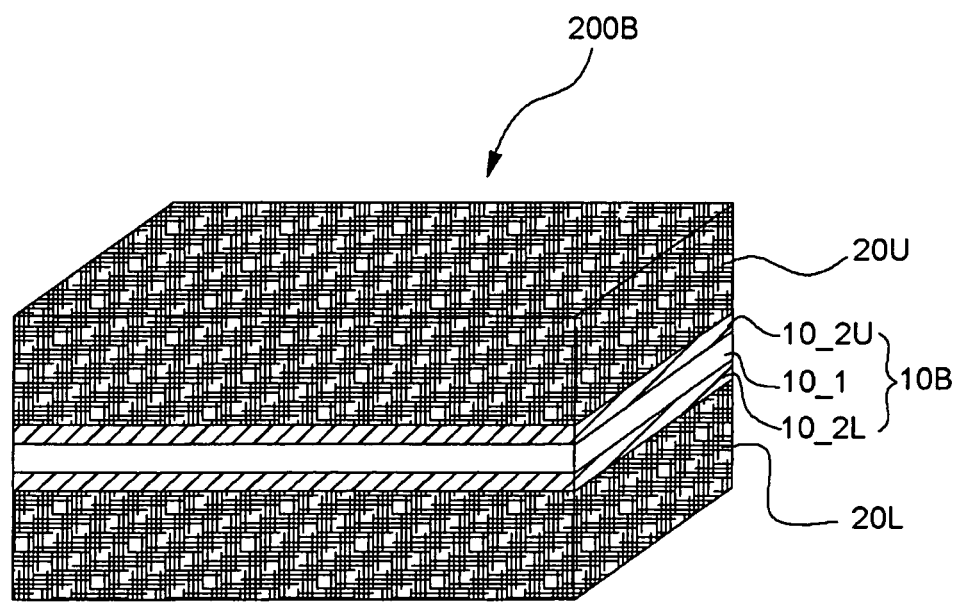

FIGS. 4A and 4B are perspective views of current collectors 200A and 200B according to various embodiments of the present invention. From among components shown in FIGS. 4A and 4B, components denoted by the same reference numerals as shown in previous drawings may be described by the descriptions given above with respect to the reference numerals unless otherwise clearly contradicted by context.

Referring to FIG. 4A, a substrate 10A of the current collector 200A may be formed of a composite material. For example, the substrate 10A may have a stacked structure including an insulation film 10_1 and a metal thin-film layer 10_2 stacked on the insulation film 10_1. The metal thin-film layer 10_2 may be formed via a sputtering method or an electroless plating method. The insulation film 10_1 may be a flexible resin-based substrate. Since a resin-based substrate exhibits superior elasticity and mechanical strength than a metal-based substrate, the conductive substrate 10A may be thinner than the conductive substrate 10 formed of a metal foil as shown in FIG. 1A. The conductive fiber layer 20 is provided on the metal thin-film layer 10_2. The conductive fiber layer 20 and the metal thin-film layer 10_2 may be adhered to each other by fusing the conductive fiber layer 20 and the metal thin-film layer 10_2 to each other by vitrifying or melting a conductive binder matrix only by applying heat, light, or pressure thereto.

Referring to FIG. 4B, the current collector 200B may include an upper conductive fiber layer 20U and a lower conductive fiber layer 20L on both main surfaces of a substrate 10B, respectively. The substrate 10B may include an upper metal layer 10_2U and a lower metal layer 10_2L, which are formed as thin films, on both main surfaces of the insulation film 10_1. As described above with reference to FIG. 4A, the metal layers may be thin-film layers. According to another embodiment of the present invention, the substrate 10B may be the conductive substrate 10, such as a metal foil or a mesh as described above with reference to FIG. 1A.

Although not shown, the conductive substrates 10A and 10B may be omitted, and a current collector may include only the conductive fiber layer 20. In this case, the conductive fiber layer 20 may include a single layer or a plurality of layers, where the layers may be adhered to one another via a fabric operation, such as a bridging operation. Furthermore, since the entire conductive fiber layer 20 is a current collector, the metal thin-film layer 10_2 may be omitted. In this case, a current collector including the conductive fiber layer 20 directly stacked on the insulation film 10_1 may be omitted. The insulation film 10_1 may be formed of a polymer resin-based material with flexibility.

Figure 5:
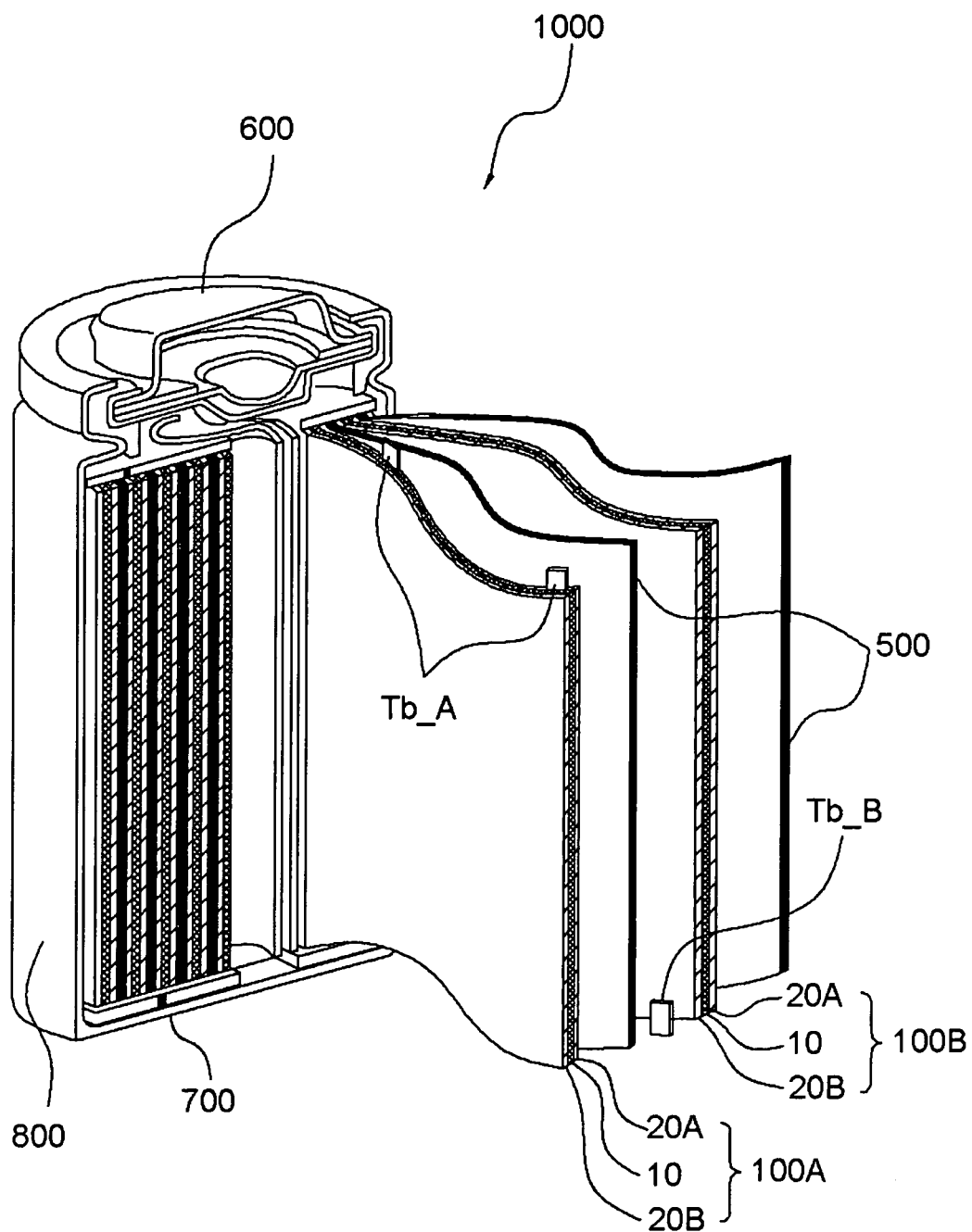
FIG. 5 is an exploded perspective view of a battery employing a non-woven fabric current collector according to an embodiment of the present invention and shows a current collector and an electrode fabricating system for fabricating an electrode.

FIG. 5 is an exploded perspective view of a battery 1000 employing a non-woven fabric current collector according to an embodiment of the present invention and shows a current collector 100_L and an electrode fabricating system FS for fabricating an electrode EL.

Referring to FIG. 5, the battery 1000 may be a cylindrical battery. To increase a battery reaction area, an electrode assembly may have a jelly roll structure in which a cathode electrode and an anode electrode respectively employing the current collectors 100A and 100B are alternately wound with each other. However, it is merely an example, and only one of a cathode electrode and an anode electrode may be configured using a current collector according to an embodiment of the present invention. Furthermore, the battery 1000 may also be manufactured as a coin-type battery, a hexahedral battery, or a flexible battery of any of various shapes using fibers.

As described above, the current collectors 100A and 100B may include upper and lower conductive fiber layers 20A and 20B on both main surfaces of the conductive substrate 10. Selectively, the current collectors 100A and 100B may include only conductive fiber layers. An electrically active material is impregnated into the upper and lower conductive fiber layers 20A and 20B, thereby providing an electrode.

Tabs or leads Tb_A and Tb_B may be formed on side surfaces of the current collectors 100A and 100B. Numbers of the tabs or leads Tb_A and Tb_B may be suitably determined to reduce internal resistance. The tabs or leads Tb_A and Tb_B may be connected to a cathode electrode 600 and an anode electrode 700 of the battery 1000 inside a housing 800, respectively.

A separator 500 may be arranged between the current collector 100A and the current collector 100B for insulation therebetween. The separator 500 may be a polymer-based micro-porous film, a woven fabric, a non-woven fabric, a ceramic, an intrinsic solid polymer electrolyte film, a gel solid polymer electrolyte film, or a combination thereof, for example. The intrinsic polymer electrolyte film may contain a straight-chain polymer material, or a bridge polymer material, for example. The gel solid polymer electrolyte film may be a plasticizer-containing polymer, a filler-containing polymer, a pure polymer, or a combination thereof. The solid electrolyte film may contain a polymer matrix, an additive, and an electrolyte consisting of any one from among polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, poly tetrafluoroethylene, a copolymer of vinylidene fluoride and hexafluoropropylene propylene, a copolymer of vinylidene fluoride and trifluoroethylene, a copolymer of vinylidene fluoride and tetrafluoroethylene, poly (methyl acrylate), poly acrylate, polyethyl acrylate, polymethyl methacrylate, polyethyl methacrylate, polybutyl acrylate, polybutyl methacrylate, polyvinyl acetate, and polyvinyl alcohol or a combination thereof, for example. However, the above-stated materials for forming the separator 500 are merely examples, and any material that is easily deformed, features excellent mechanical strength, is not torn or cracked by deformations of the electrodes 100A and 100B and features an arbitrary suitable electron insulation and excellent ion conductivity may be selected for the separator 500.

The separator 500 may be a single-layer film or a multilayered film, where the multilayered film may be a stacked structure of same single layer films or a stacked structure of single layer films formed of different materials. For example, the stacked structure may have a structure including a ceramic coating layer formed on a surface of a polymer electrode film, such as a polyolefin film. In consideration of durability, shutdown function, and safety of a battery, thickness of the separator 500 may be from about 10 μm to about 300 μm, may preferably be from about 10 μm to about 40 μm, and more preferably, may be from about 10 μm to about 25 μm.

In the housing 800, a suitable aqueous electrolyte containing a salt, such as potassium hydroxide (KOH), potassium bromide (KBr), potassium chloride (KCL), zinc chloride ($ZnCl_2$), and sulfuric acid $H_2SO_4$ may be absorbed to the electrode structures 100a and 100b and/or the separator 500, thereby completing the battery 1000. According to another embodiment, the battery 1000 may be a non-aqueous electrolyte, such as ethylene carbonate, propylene carbonate, dimethyl carbonate, or diethyl carbonate containing a lithium salt, such as $LiClO_4$ or $LiPF_6$. However, the present invention is not limited thereto. Furthermore, although not shown, a suitable cooling device or a battery managing system for controlling stability and/or power supply characteristics while the battery 1000 is being used may be further attached to the battery 1000.

Due to fibrous characteristics thereof, an electrode employing the non-woven fabric current collector may be easily deformed. Furthermore, since an electrically active material and a conductive network are substantially uniformly mixed throughout the entire volume of an electrode structure, even if thickness of an electrode is increased for adjusting capacity of a battery, deterioration of battery performance, which occurs in a conventional battery structure obtained by coating an active material layer on a metal foil, does not occur. Therefore, an electrode may have any of various capacities and volumes.

Furthermore, due to easy deformability of a fabric electrode structure, an electrode may not only be fabricated as a jelly roll type, but also be 3-dimensionally arranged by being bent, and wound and may not only be a cylindrical battery as described above, but also be a hexahedral battery, a pouch-type battery, or one of batteries having various volumes and shapes integrated to a fabric product like a cloth or a bag, where the electrode may be mechanically reinforced to be highly durable against deformation by conductive patterns and may be highly adaptive to manufacturing operations based on continuous transfer. Furthermore, it should be understood that the above-stated electrode structures may be applied to a cathode, an anode, or both of the same in a single battery.

The above-stated non-woven fabric current collectors may be applied not only to a lithium ion battery, but also to a lithium metal battery, a lithium air battery, a nickel hydride battery, or a NaS battery. However, it is merely an example, and one of ordinary skill in the art will understand that the present invention is not limited thereto.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A current collector for a secondary battery comprising a conductive fiber layer, the conductive fiber layer comprising a conductive network formed from a plurality of conductive fibers and a plurality of auxiliary filaments:
    wherein each of the conductive fibers is a composite fiber of core-sheath structure comprising a conductive core comprised of a plurality of long metal filaments and a sheath comprised of a conductive binder matrix surrounding the core, and
    wherein the auxiliary filaments are short metal filaments having lengths of about 1% to about 50% lengths of the long metal filaments and are bare metal filaments without a conductive binder matrix.

2. The current collector of claim 1, wherein the conductive fiber layer further comprises a non-woven fabric structure including pores formed from a surface of the conductive fiber layer to an interior of the conductive fiber layer.

3. The current collector of claim 1, further comprising a substrate combined with a surface of the conductive fiber layer.

4. The current collector of claim 3, wherein the substrate is combined with the conductive fiber layer via fusion of the conductive binder matrix.

5. The current collector of claim 3, wherein the substrate comprises a metal foil, a mesh, a polymer resin-based insulation film, a metal thin-film layer, or a stacked structure thereof.

6. The current collector of claim 1, wherein the long metal filaments comprise a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof.

7. The current collector of claim 1, wherein the conductive binder matrix is coated onto each of the conductive cores.

8. The current collector of claim 1, wherein the auxiliary filaments comprise a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof.

9. The current collector of claim 8, wherein the conductive binder matrix comprises polyaniline, polyoxyphenylene, polyphenylene sulfide, polythiophene, polyfuran, polypyrrole, polymethylpyrrole, polystyrene, a derivative thereof, or a copolymer thereof.

10. The current collector of claim 1, wherein the conductive binder matrix is a mixed composition of a polymer binder material and a conductive material dispersed in the polymer binder material.

11. The current collector of claim 10, wherein the polymer binder material comprises carboxy methyl cellulose (CMC), polybutadiene, polyisoprene, polybutyl acrylate, polybutyl methacrylate, polyhydroxyethyl methacrylate, polyacrylamide, polyisobutylene, isobutylene-isoprene rubber, polyvinylidenefluoride-hexafluoropropylene copolymer (PVDF-co-HFP), polyvinylidenefluoride (PVDF), polyacrylonitrile, polymethylmethacrylate, polytetrafluoroethylene (PTFE), styrenebutadiene rubber (SBR), butyl acrylate-styrene copolymer, butyl acrylate-acrylic nitrile copolymer, butyl acrylate-acrylic nitrile-glycidyl methacrylate copolymer, isobutylene-styrene copolymer, ethylene-propylene-diene copolymer: EPDM, a derivative thereof, a homopolymer thereof, a condensation polymer thereof, a copolymer thereof, a block polymer thereof, or a combination thereof.

12. The current collector of claim 10, wherein the conductive material comprises carbon black, superfine graphite particles, acetylene black, fine carbon, a metal particle, metal indium tin oxide (ITO), carbon nanotubes, or a combination thereof.

13. The current collector of claim 1, wherein the conductive binder matrix is gelated.

14. An electrode comprising:
a current collector for a secondary battery comprising a conductive fiber layer, the conductive fiber layer comprising a conductive network formed from a plurality of conductive fibers and a plurality of auxiliary filaments:
wherein each of the conductive fibers is a composite fiber of core-sheath structure comprising a conductive core comprised of a plurality of long metal filaments and a sheath comprised of a conductive binder matrix surrounding the core, and
wherein the auxiliary filaments are short metal filaments having lengths of about 1% to about 50% lengths of the long metal filaments and are bare metal filaments without a conductive binder matrix.

15. The electrode of claim 14, wherein a thickness of the conductive binder matrix is from about 10% to about 90% of an average particle size of the electrically active material.

16. The electrode of claim 14, wherein the conductive binder matrix is gelated.

17. The electrode of claim 14, wherein the conductive fiber layer further comprises a non-woven fabric structure.

18. The electrode of claim 17, wherein the non-woven fabric structure includes pores formed from a surface of the conductive fiber layer to an interior of the conductive fiber layer.

19. The current collector of claim 1, wherein the conductive fibers constitute a skeleton structure of the conductive fiber layer and determine overall conductivity and a mechanical strength of the current collector and the auxiliary filaments determine internal resistance of a battery by improving electron transferring paths between an electrically active material and the metal filaments or electrical connections between the conductive fibers.

* * * * *